(12) United States Patent
Bech

(10) Patent No.: US 9,316,202 B2
(45) Date of Patent: Apr. 19, 2016

(54) ANTI-OSCILLATION APPARATUS AND TECHNIQUE FOR SECURING WIND TURBINE BLADES AGAINST OSCILLATIONS

(75) Inventor: Anton Bech, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 736 days.

(21) Appl. No.: 13/513,000

(22) PCT Filed: Dec. 1, 2010

(86) PCT No.: PCT/EP2010/068675
§ 371 (c)(1),
(2), (4) Date: Aug. 13, 2012

(87) PCT Pub. No.: WO2011/067304
PCT Pub. Date: Jun. 9, 2011

(65) Prior Publication Data
US 2012/0301293 A1    Nov. 29, 2012

Related U.S. Application Data

(60) Provisional application No. 61/265,982, filed on Dec. 2, 2009.

(30) Foreign Application Priority Data

Dec. 2, 2009 (GB) .................................. 0921154.1

(51) Int. Cl.
*F03D 1/00* (2006.01)
*F03D 11/00* (2006.01)
(52) U.S. Cl.
CPC ............... *F03D 1/001* (2013.01); *F03D 1/003* (2013.01); *F03D 11/00* (2013.01); *Y02B 10/30* (2013.01); *Y02E 10/722* (2013.01); *Y02E 10/728* (2013.01)

(58) Field of Classification Search
CPC .......... F03D 1/001; F03D 1/003; F03D 1/005; F03D 1/0675; F03D 7/0268; F03D 1/0658; F03D 1/00; F04D 29/00; B66C 23/185
See application file for complete search history.

(56) References Cited

U.S. PATENT DOCUMENTS 4,879,084 A * 11/1989 Parnigoni ...................... 264/295
7,207,777 B2 * 4/2007 Bervang ......................... 416/119
(Continued)

FOREIGN PATENT DOCUMENTS

DE    102004056340 A1    5/2006
DE    102005025646 A1    12/2006
DE    102007003000 A1    3/2008

OTHER PUBLICATIONS

International Search Report from counterpart PCT Application No. PCT/EP2010/068675 mailed on Apr. 18, 2011 (2 pages).

*Primary Examiner* — Nathaniel Wiehe
*Assistant Examiner* — Jason Davis
(74) *Attorney, Agent, or Firm* — Wood, Herron & Evans, LLP

(57) ABSTRACT

The invention relates to a method of operating a wind turbine (1) to guard against oscillations of the wind turbine blades (5) when they are at a standstill or idling at low speeds, and to a wind turbine blade anti-oscillation apparatus (10). The apparatus comprises a releasably attachable blade cover (10) that provides a non-aerodynamic surface for a region of the blade. This has been found to prevent air flow adhering to the blade and periodically detaching in a phenomenon known as vortex shedding, and therefore prevents oscillations of the blade becoming problematic. The blade cover can comprise a sleeve (10) of a net-like material, that can be positioned on the blade either before installation or in the field by service engineers using guide lines 16 and 17.

15 Claims, 5 Drawing Sheets

(56) References Cited

U.S. PATENT DOCUMENTS

| | | | |
|---|---|---|---|
| 8,052,396 B2 * | 11/2011 | Wobben | 416/244 R |
| 2006/0120809 A1 * | 6/2006 | Ingram et al. | 405/195.1 |
| 2007/0110585 A1 * | 5/2007 | Bonnet | 416/235 |
| 2007/0290426 A1 * | 12/2007 | Trede et al. | 269/1 |
| 2012/0020798 A1 * | 1/2012 | Barnsley | 416/223 R |

* cited by examiner

ANTI-OSCILLATION APPARATUS AND TECHNIQUE FOR SECURING WIND TURBINE BLADES AGAINST OSCILLATIONS

This invention relates to an anti-oscillation apparatus and to technique for securing wind turbine blades against oscillations.

A typical horizontal axis wind turbine is illustrated in FIG. 1 to which reference should now be made. FIG. 1 illustrates a wind turbine 1, comprising a wind turbine tower 2 on which a wind turbine nacelle 3 is mounted. A wind turbine rotor 4 comprising at least one wind turbine blade 5 is mounted on a rotor hub 6.

The hub 6 is connected to the nacelle 3 through a shaft (not shown) extending from the nacelle front. The nacelle 3 can be turned, using a yaw drive positioned at the top of the tower 1, to change the direction in which the rotor blade hub 6 and the blades 5 are facing. The blades are aerodynamically profiled so that they experience a 'lift' or pressure from the wind as the wind flows past the surface of the blade. The angle or pitch at which the leading surface of the blade aerodynamic profile meets the incident wind can be altered using a pitch drive, that turns the blades 5 with respect to the hub 6.

The wind turbine illustrated in FIG. 1 may be a small model intended for domestic or light utility usage, or may be a large model, such as those that are suitable for use in large scale electricity generation on a wind farm for example. A typical commercial wind turbine, for example one that is designed to generate say 3 MW of power, can stand approximately 100 meters high and have wind turbine blades with a length of around 40 m or more. The size of the wind turbine blade, and in particular the area that is swept out by the blades as they turn in the wind is linked to the amount of energy the turbine can extract from the wind. In commercial energy generation wind turbines are therefore large so that they provide the greatest generation capacity.

In normal generation, the yaw drive turns the nacelle 3 so that the blades 5 of the wind turbine are pointed into the wind. The pitch of the blades can then be adjusted so that they force they experience from the wind is maintained within safe operating parameters, while generating as much energy from the incident wind as possible.

When the wind turbine is not generating power, such as before connection to the grid or during times of maintenance, the blades of the turbine are to as great an extent as possible turned out the wind by means of the yaw drive and pitch drives so that the blades do not experience much force from the incident wind. In this case, the wind turbine blades may be brought to a stand still and locked.

When the blades of the wind turbine are locked and at a stand still, they are prone to edge wise blade oscillations (edge wise is the direction from the leading edge to the trailing edge of the blade) resulting from the air flow across or around the blade, when the wind hits the blade from the side. If the wind turbine blades can be feathered with respect to the wind, then the wind flows around the blades smoothly, but without power to continuously adjust the blade pitch, the wind direction will inevitably change and result in a situation where the flow around the blade is not smooth. The worst case is when the incident wind meets the blade perpendicular to one of its flat surfaces and has to flow around the leading and trailing edge of the blade. If the oscillations are of a large enough magnitude, they can result in physical damage to the structure of the wind blade that is costly and time consuming to repair.

The problem is caused by the largely unstable flow of air around the rotor blade, particularly the leading edge, when the blade is pitched out of the wind. The air flows around the curved surface of the blade, but cannot stay attached to the blade surface in laminar flow because the blade is not pitched correctly to support lift. As a result, a laminar air flow may briefly occur but is then lost, resulting in the formation of a vortex in the flow on the leeward side of the blade. This situation is often referred to as a vortex shedding flow, and it has the characteristic that the separations in the air tend to shift from one side of the blade to the other in a rhythmic air flow. These oscillations are typically experienced first at the tip of the blade, where the reduced diameter and lighter frame offer less resistance to the rhythmic shifting force provided by the air. If the rhythmic oscillation provided by the air flow corresponds to the resonance frequency of the blade itself, the blade can eventually suffer a catastrophic failure.

Many wind turbines therefore comprise mechanical or hydraulic devices that dampen oscillations induced in the wind turbine blade before they can develop a magnitude that is sufficient to damage the blade. Although, such devices do solve the problem, they can be expensive and difficult to install. We have therefore appreciated that there is a need for an apparatus and method for addressing such oscillations in the blade.

SUMMARY OF THE INVENTION

In a first aspect, the invention provides a method of operating a wind turbine to inhibit oscillations induced by the air flow across the blades when the wind turbine is in a non-operational mode, the method comprising: releasably locking the wind turbine blades in place; securing a releasably attachable temporary blade cover to the wind turbine blade so that the blade cover covers a region of the blade surface and provides a non-aerodynamic outer surface for inducing turbulence in the air flow across the blade. Air flowing across the surface of the blade cannot therefore adhere sufficiently well to the blade for laminar flow to be established, even briefly, and as a result the likelihood of rhythmic vortex shedding occurring, and the magnitude of any vortex shedding oscillation that does occur, have been found to be significantly reduced.

In one embodiment, the blade cover is a sleeve, and the method comprises: attaching a first guide line to an attachment point at one end of the sleeve; pulling the sleeve onto the wind turbine blade; tying the guide line to the wind turbine to secure the sleeve in place. This allows the sleeve to be attached either at the point of manufacture, so that when the blade is installed on the wind turbine the blade cover remains in place until the turbine is ready for use, or alternately allows attachment in the field.

In one embodiment, the sleeve is formed from netting as this has been found to provide a non-aerodynamic surface to the blade once in place, and has the advantages of being relatively light and easy to fabricate. Alternatively, the blade cover may be a sleeve having protrusions or indentations in its surface to create the non-aerodynamic outer surface.

In one embodiment, the method comprises: lowering one end of the first guide line from the nacelle or the hub of the wind turbine to a service engineer at the ground. The service engineer at the ground can then attach the guide line to the sleeve.

In one embodiment, the method comprises at the ground, attaching a second guide line to the sleeve, so that pulling on the ends of the first and second guide lines pulls the length of the sleeve taut. The service engineer at the ground can attach the second ground line to provide a positioning line as the sleeve is hoisted upwards towards the blade.

In a further embodiment the blade cover comprises an adhesive surface section for attachment directly to the surface of the blade, and the method comprises attaching the adhesive surface section to the blade surface. This allows the surface section to easily be attached to the blade before transport or installation.

In one embodiment, the blade cover is formed from a net-like material. The net material preferably has an open mesh having a mesh spacing in at least one direction in the range 25 mm to 100 mm. The blade cover may also have protrusions or indentations in its surface to create the non-aerodynamic outer surface, preferably having a depth in the range of 5 mm to 10 mm.

A wind turbine blade anti-oscillation apparatus is also provided.

BRIEF DESCRIPTION OF THE DRAWINGS

The invention will now be described in more detail, and by way of example, with reference to the drawings, in which.

DETAILED DESCRIPTION OF THE PREFERRED EMBODIMENTS

Figure 1:
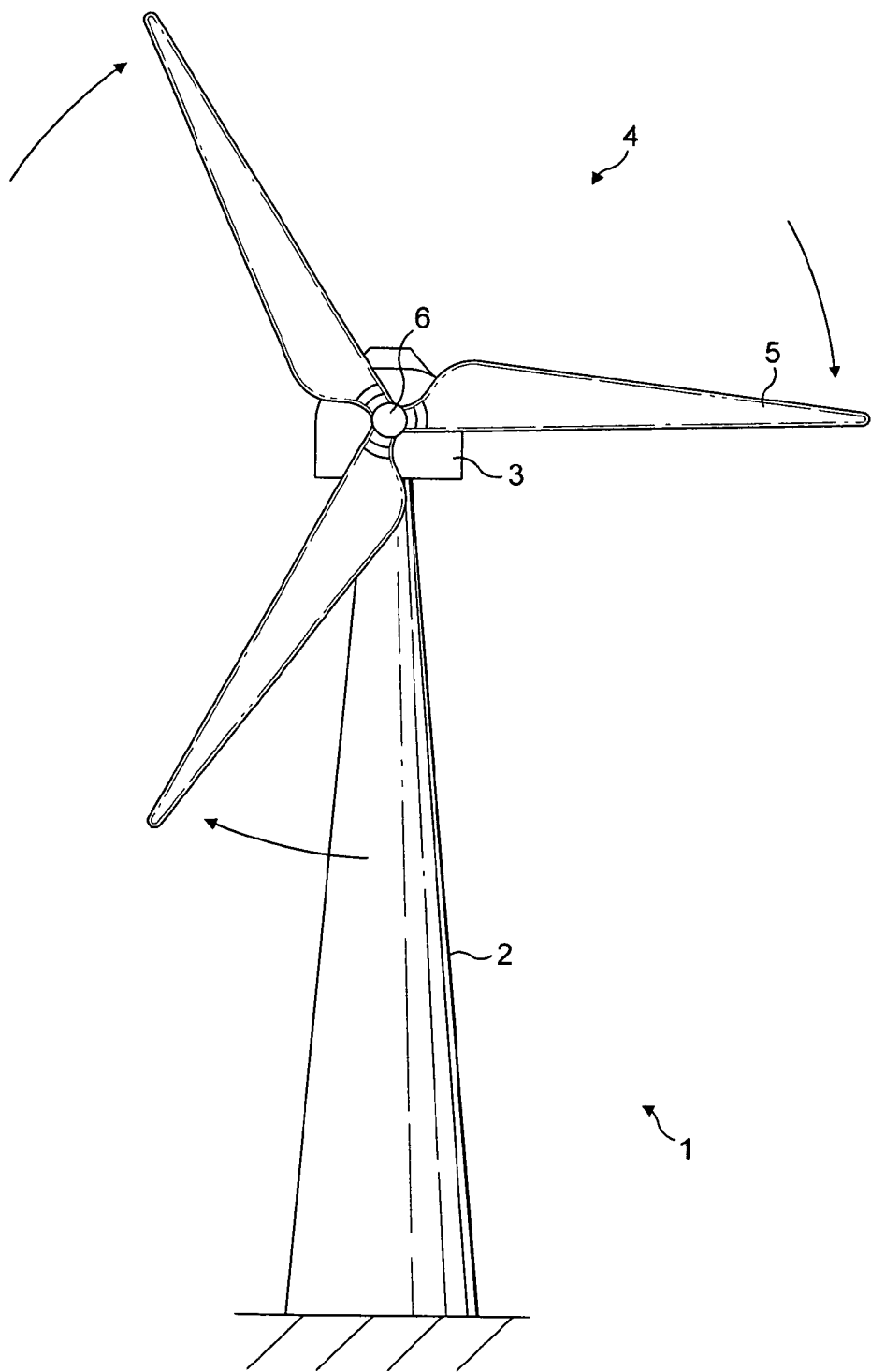
FIG. 1 is a schematic illustration of a wind turbine.
Figure 2:
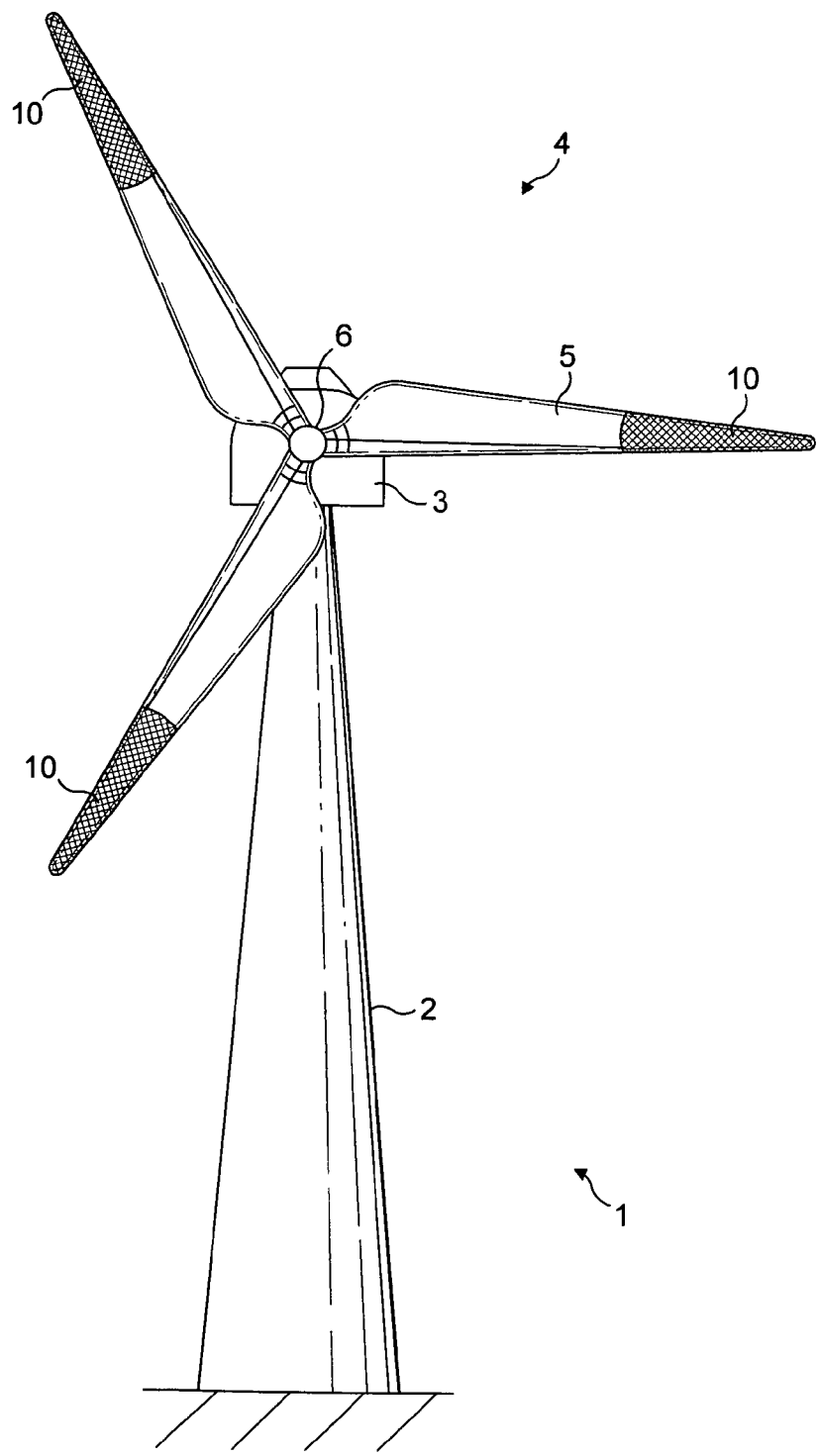
FIG. 2 is a schematic illustration of a wind turbine according to the invention, including an anti-oscillation apparatus fitted to the wind turbine blades.

A first example of the invention will now be described in more detail with reference to FIGS. 2 and 3 of the drawings.

The example anti-oscillation apparatus comprises a sleeve 10 that is fitted over the tip of a wind turbine blade 5 when the blade is in a stationary position. Attachment of the sleeve 10 can be carried out in situ when the wind turbine blades of an operational wind turbine have been locked in position for maintenance or repair. Alternatively, the sleeve 10 can be attached to the blade 5 in the factory, prior to installation of the blade 5 on the wind turbine tower 2, and before the wind turbine is connected to the grid to output electricity. In both cases, therefore, the wind turbine can be thought of as being in a non-operational mode. Once the sleeve is in place, the blade can be unlocked and can idle in a feathered position, if desired.

Figure 3:
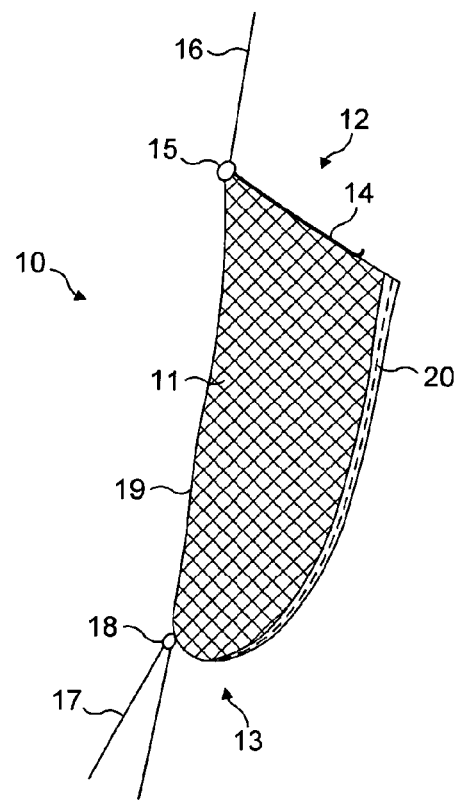
FIG. 3 is a side elevation view of a first example of an anti-oscillation sleeve for a wind turbine blade.

The construction of an example anti-oscillation sleeve 10 is shown in more detail in FIG. 3. The sleeve 10 comprises a substantially net-like or otherwise coarse material 11 having at least one open end 12 for manoeuvring onto the tip of the wind turbine blade 5. In the example shown in FIG. 3, the sleeve 10 has the shape of a sock or pocket and the end 13 of the sleeve 10 opposite the open end 12 is therefore closed. In other examples the end 13 may also be open, in which case the sleeve 10 is closer in shape to a tubular wind sock having two open ends. Although, the sleeve 10 can be thought of as substantially tubular, in that its length dimension is larger than its width, it will be appreciated the sleeve 10 tapers towards its end 13 to fit more snugly around the smaller dimension (e.g., chord or thickness) of wind turbine blade tip. Further, it may also have a flattened cross-section to follow the flattened cross-section of the blade away from the root.

The open end 12 of the sleeve 10 comprises a resilient reinforcement 14 that both provides structural strength to the open end 12 of the sleeve and in a default position keeps the end 12 of the sleeve sprung open for ease of positioning the sleeve 10 on the blade tip 5. This is shown more clearly in FIG. 5. The resilient reinforcement 14 can be comprised of a metal, plastic or other suitable material as desired.

Figure 4:
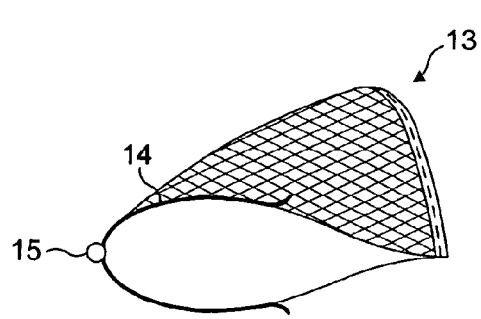
FIG. 4 is a top elevation view of a first example of an anti-oscillation sleeve for a wind turbine blade shown in a closed position.
Figure 5:
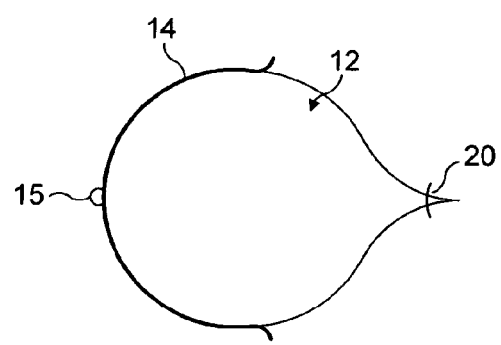
FIG. 5 is a top elevation view of a first example of an anti-oscillation sleeve for a wind turbine blade shown in an open position.

As seen more clearly in FIGS. 4 and 5, the resilient reinforcement 14 has a loop or eye 15 at its centre that provides an attachment point for one 16 of two guide ropes or lines 16 and 17 by which the sleeve 10 can be hoisted into position. The resilient reinforcement 14 is attached to the sleeve 10 so that the loop 15 is conveniently disposed at one end of the sleeve 10. The other guide rope 17 is secured to a second loop or eye 18 attached at the other end 13 of the sleeve 10 directly below and on the same edge of the sleeve. Preferably, this edge of the sleeve comprises a reinforcing cord 19, such as a rope or cable, connected between the two loops 15 and 18. The loop 18 can in fact be attached directly to the reinforcing cord 19. The reinforcing cord 19 prevents damage to the sleeve 10 when the force on the guide ropes 16 and 17 becomes large, such as when the sleeve 10 is being pulled into position.

In one embodiment, the sleeve 10 can be made from a single piece of material, with the reinforcing cord 19 being located in its centre, and the edges of the material being folded over and connected together, by any suitable means, such as stitching or sewing. In this case, the opposite edge of the sleeve 10 to the reinforcing cord may comprise a stitch line 20.

The material 11 making up the sleeve 10 may be any material that can be formed into the sock or pocket shape mentioned above, but that will not be too coarse to damage the surface of the wind turbine blade as the sleeve 10 is attached. Fibre materials that are soft and flexible are therefore advantageous, such as but not limited to organic fibres like hemp, sisal, jute, and cotton; synthetic or artificial fibres such as polyamide, polypropylene, polyethylene or any suitable thermoplastic fibrous material; and monofilament materials, such as polyethylene or rubber. In the examples described here, the weave or mesh size of the netting is in the range 10×10 mm to 100×100 mm in mask. Depending on the application, it could also have a finer or a more open mesh.

The sleeve 10 can be secured over the end of the wind turbine blade during the manufacturing process and attached using ropes or pulleys (not shown) to the root of the blade where the blade is attached to the hub. Alternatively, a key advantage with the sleeve 10, described above, is that it can be secured over the end of the wind turbine blades by service engineers, when the turbine is put into a non-operational mode and the blades are locked down for repair or maintenance.

Figure 6:
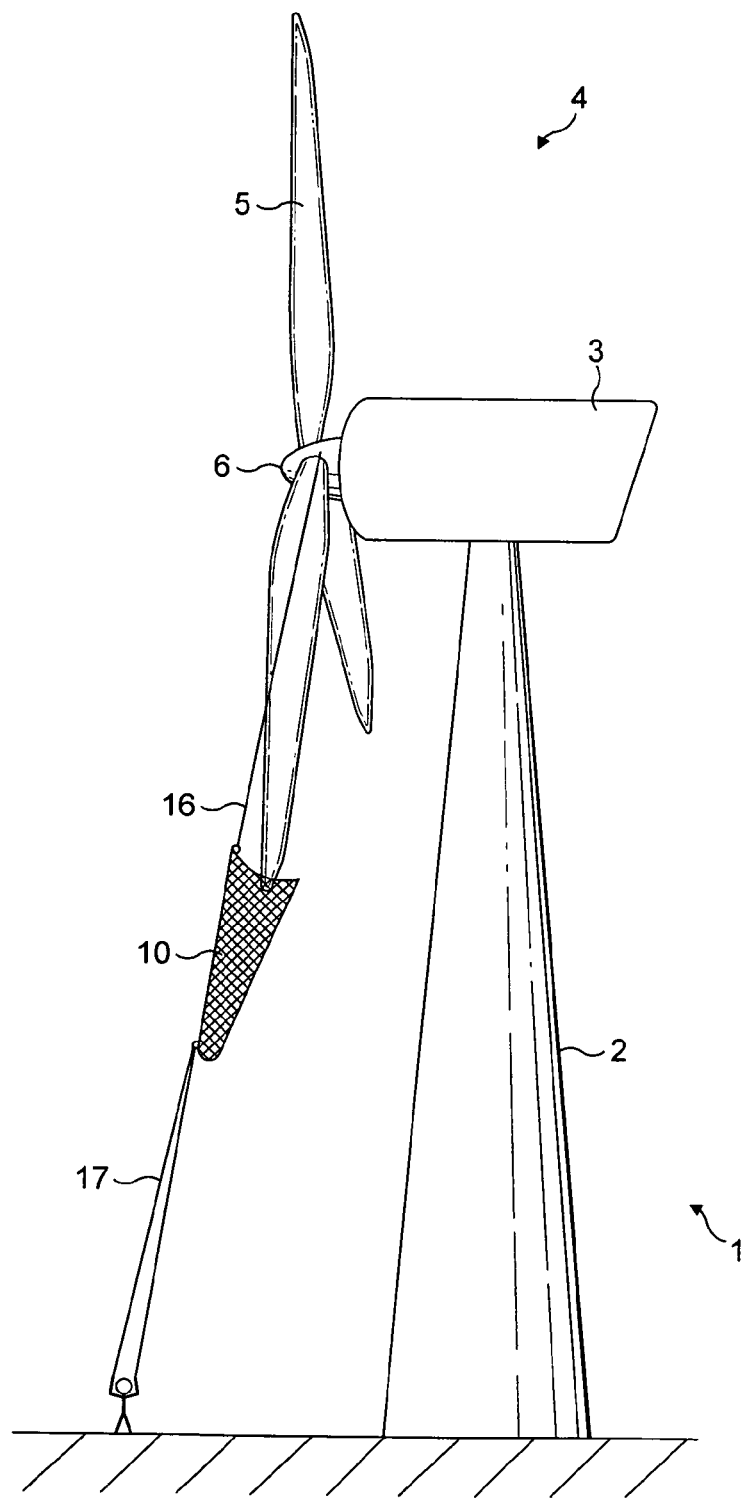
FIG. 6 is a schematic illustration of a technique for attaching the anti-oscillation apparatus according to a first example to the blade of a wind turbine.

The process of securing the anti-oscillation sleeve 10 over the blades of a wind turbine is shown in FIG. 6 to which reference should now be made. First, the blades 5 are rotated into a position where one of the blade points towards the ground, and the wind turbine is stopped. For safety, the wind turbine blades may be locked in this position, at least temporarily, while the service engineers are at work.

A service engineer in the hub of the rotor blade lets down the pull guide rope 16 from a position in the nacelle 3 or the hub 6 of the wind turbine 1, while securing the other end to the wind turbine body. A service engineer at the ground secures the pull guide rope 16 to the loop 15, and threads the ground line 17 guide rope through the loop 18. The service engineer in the hub 6 or nacelle 3 then applies a force to the guide rope 16, while the service engineer on the ground holds both ends of line 17. The service engineer in the hub 6 or the nacelle 3 can then pull on the pull guide rope 16 to pull the open end of the sleeve 10 towards the tip of the wind turbine blade 5. As shown in FIG. 5, the resilient reinforcement 14 keeps the end of the sleeve 10 open allowing it, with some care and attention, to be threaded over the tip of the blade 5. The ground engineer, having a better view point of the blade tip, which for obvious reasons is preferably directed towards the ground for this procedure, is crucial in guiding the open end 13 of the sleeve 10 into place. Once the sleeve 10 has been threaded over the blade 5, the service engineer in the nacelle 3 or hub 6 can pull further on the pull guide rope 16 sliding the resilient reinforcement 14 upwards and along the length of the blade until it can slide no further. The increasing dimension (e.g., chord or thickness) of the blade 5 in the direction of the root will mean that it will eventually fill out the sleeve 10 preventing further movement, or otherwise the tip of the blade 5 will meet the closed end 13 of the sleeve 10. In this situation the dimension (e.g., chord or thickness) of the blade 5 will have taken up the slack in the sleeve 10 material, and resilient reinforcement, so that the sleeve will adopt the shape shown in FIG. 4, pulled tight across the chord direction of the blade.

Once the sleeve 10 is in place, the service engineer in the nacelle 3 or hub 6 secures the end of the pull guide rope 16 not attached to the loop 15 to a suitable location on the wind turbine structure (a dedicated tie-off point can be provided for this purpose if required, though one is not strictly necessary). The hub 6 or blade root is preferred for the tie-off point however, as it allows the tie-off points to rotate with the wind turbine blades. The service engineer at the ground then lets go of one end of the ground line 17 and pulls the rope from the lower loop 18. The sleeve 10 is then in place, and can be detached from the wind turbine simply by releasing the attachment of the pull guide rope 16 to the wind turbine structure. To attach the sleeve 10 to the other blades 5 of the wind turbine, the blades are manoeuvred to face towards the ground, and the process described above is repeated. Once a sleeve is attached to each blade, the wind turbine blades 5 can be locked in place.

The sleeve 10, once in place on wind turbine blade 5, then prevents vortex shedding induced oscillation of the wind turbine blade, by deliberately causing turbulent air flow at the blade surface and preventing the air flow from adhering to the blade. It is only when the air can adhere to the blade that the phenomenon of rhythmic vortex shedding occurs, as the air sticks, detaches, sticks and detaches in turn. We have therefore appreciated that a sleeve 10 or other similar structure attached to the blade to provide a rough, non-aerodynamic surface will cause turbulence and prevent the air from sticking to the blade, therefore breaking the cycle, and preventing or significantly reducing the magnitude of any vortex shedding that occurs.

For this reason, the material is preferably a net-like material, as this has been found to be effective in causing turbulence at the blade surface and in reducing vortex shedding, by efficiently covering the leading edge of the blade. The open mesh or weave of the net ensures an irregular surface air boundary between the air and the blade, and is advantageously used as the sleeve 10 as it is easy to produce, and therefore not costly. The mesh or weave of the net can for example leave open spaces in the netting having dimensions of around 25 mm to 100 mm, in at least one dimension or square, with a preferable dimension of 50 mm. If the net is too open of course the disruption to the laminar flow of air around the blade will not be reduced significantly for the net to have the desired effect. Additionally, it has been found desirable if the diameter of the cord from which the net is fashioned be in the range 1 mm to 5 mm, with a typical value in use being 2 mm to 3 mm. The net cording can have greater diameter, but then the weight of the net needs to be carefully assessed.

The net sleeve can also suppress oscillations caused by negative aerodynamic damping at airflow directions causing transition between lift and stall. The net gives a poor lift performance, which reduces the force variation between the lift and stall conditions, and thus reduces the amount of energy available for oscillation.

It is not however necessary to use a net-like material however as the anti-oscillation sleeve 10, and it will be appreciated from the description that any material could be used that has a coarse external surface, either due to the weave of the material or due to the presence of protrusions, indentations specifically engineered into its surface. The temporary surface section could for example be engineered to resemble plastic or foam packaging sheets or filler material. A height 5 to 10 mm for example in the depth of the protrusions or indentations of any surface shape has been found more than sufficient to cause a severe disruption to the laminar flow.

Figure 7:
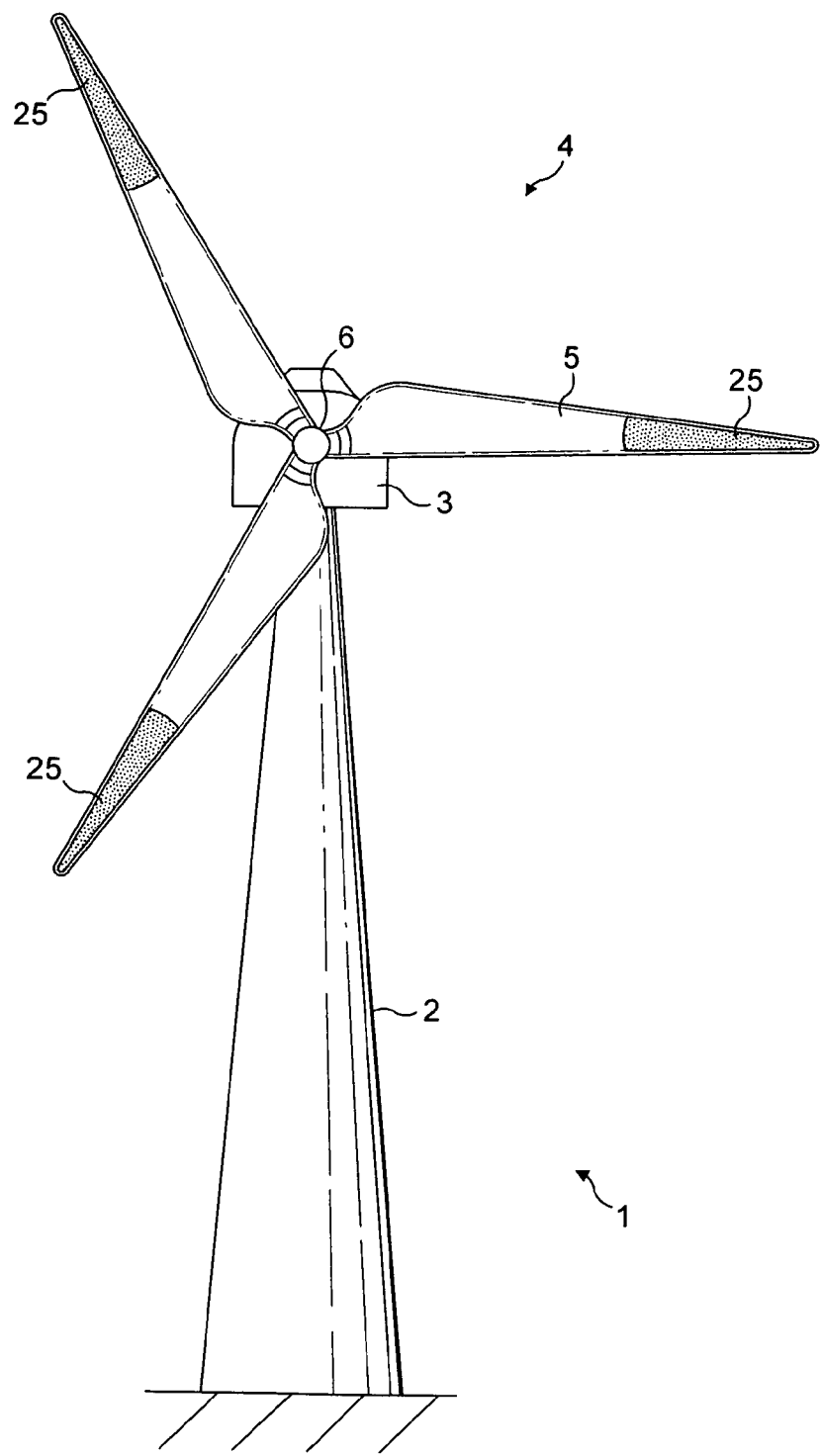
FIG. 7 is a schematic illustration of a second example of an anti-oscillation device for a wind turbine blade.

A second example of an anti-oscillation apparatus will now be described with reference to FIG. 7. In this example, instead of sleeve 10, temporary surface sections 25 are attached to the blade surface by means of adhesive or mechanical fastenings. As with the first example, the surface of the temporary surface section 25 comprises protrusions or indentations in its surface that cause turbulent air flow. The temporary surface section 25 can be manufactured from similar material to that from which the sleeve 10 is made, and attached via a backing sheet and suitable adhesive directly to the blade surface. The second example of FIG. 7 is harder to implement than the first when the temporary surface sections 25 are to be applied to wind turbine blades in the field, but the second example is relatively easy to install on the blades 5 in the factory before the blades are attached to the wind turbine and wind turbine begins operation. The temporary surface section can be peeled off from the blade by providing a suitable cable attached to the section that can be grasped by a service engineer.

As with the example above, it is preferable that the temporary surface section 25 covers at least the leading edge of the blade as it is the leading edge where the phenomenon of vortex separation typically occurs.

It will be appreciated that the temporary anti-oscillation surface provided by the sleeve 10 or the surface section 25 may cover only the region of the blade from the tip to an intermediate portion of the blade, or may cover the entire length of the blade, or solely even cover just an intermediate region away from tip of the blade 5. As noted above, however, it is usually preferred to cover the tip of the blade 5 as this is the region most susceptible to oscillation. It will be appreciated that as the length of a wind turbine blade can be of the order of 40 m in length, the length of the blade cover or temporary surface section can be anywhere in the range of a few meters to a few tens of meters.

The invention claimed is:

1. A method of operating a wind turbine, comprising:
    providing a wind turbine having a tower, a nacelle mounted to the tower, and a rotor rotatably mounted to the nacelle, the rotor comprising a hub and at least one blade mounted to the hub, the wind turbine having an operational mode and a non-operational mode, wherein when in the operational mode electrical energy is being supplied from the wind turbine, and wherein when in the non-operational mode the wind turbine rotor is installed but the wind turbine is selectively configured such that no electrical energy is being supplied from the wind turbine; and when the wind turbine is in the non-operational mode, the method further comprising:

releasably locking the at least one wind turbine blade in place;

securing a releasably attachable temporary blade cover to the at least one wind turbine blade so that the blade cover covers a region of the blade surface; and maintaining the blade cover on the at least one wind turbine blade during the non-operational period of the wind turbine, the blade cover providing a non-aerodynamic outer surface for inducing turbulence in the air flow across the blade so as to inhibit blade oscillations induced by the air flow across the blade.

2. The method of claim 1, wherein the blade cover is a sleeve, and the method comprises:

attaching a first guide line to an attachment point at one end of the sleeve;

pulling the sleeve onto the wind turbine blade;

tying the guide line to the wind turbine to secure the sleeve in place.

3. The method of claim 2, wherein the method comprises:

lowering one end of the first guide line from the nacelle or the hub of the wind turbine to a service engineer at the ground.

4. The method of claim 3, comprising at the ground, attaching a second guide line to the sleeve, so that pulling on the ends of the first and second guide lines pulls the length of the sleeve taut.

5. The method of claim 1, wherein the blade cover is a sleeve formed from a net-like material.

6. The method of claim 5, wherein the net is an open mesh having a mesh spacing in at least one direction in the range 25 mm to 100 mm.

7. The method of claim 5, wherein the net is fashioned from a cord having a diameter in the range of 1 mm to 5 mm.

8. The method of claim 1, wherein the blade cover is a sleeve having protrusions or indentations in its surface to create the non-aerodynamic outer surface.

9. The method of claim 8, wherein the protrusions or the indentations have a depth in the range of 5 mm to 10 mm.

10. The method of claim 1, wherein the blade cover comprises an adhesive surface section for attachment directly to the surface of the blade, and the method comprises attaching the adhesive surface section to the blade surface.

11. The method of claim 10, wherein the blade cover is formed from a net-like material.

12. The method of claim 11, wherein the net is an open mesh having a mesh spacing in at least one direction in the range 25 mm to 100 mm.

13. The method of claim 11, wherein the net is fashioned from a cord having a diameter in the range of 1 mm to 5 mm.

14. The method of claim 10, wherein the blade cover has protrusions or indentations in its surface to create the non-aerodynamic outer surface.

15. The method of claim 14, wherein the protrusions or the indentations have a depth in the range of 5 mm to 10 mm.

* * * * *